A. KUBICKI.
TRAP.
APPLICATION FILED JULY 8, 1921.

1,425,023.

Patented Aug. 8, 1922.
3 SHEETS—SHEET 1.

INVENTOR:-
Andrew Kubicki
ATTORNEYS.

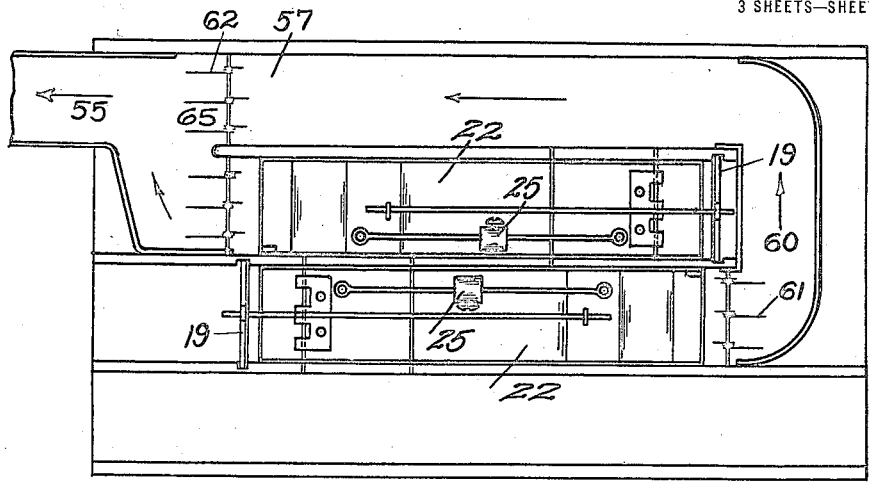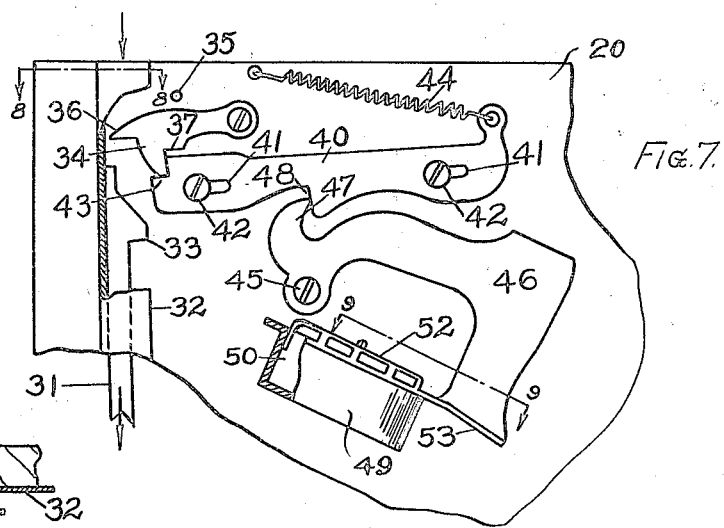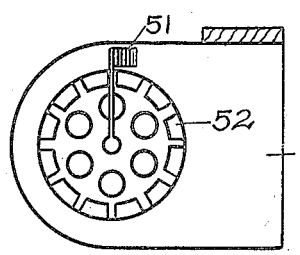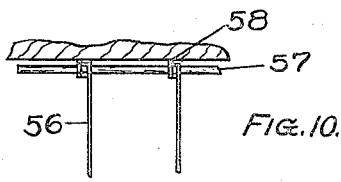

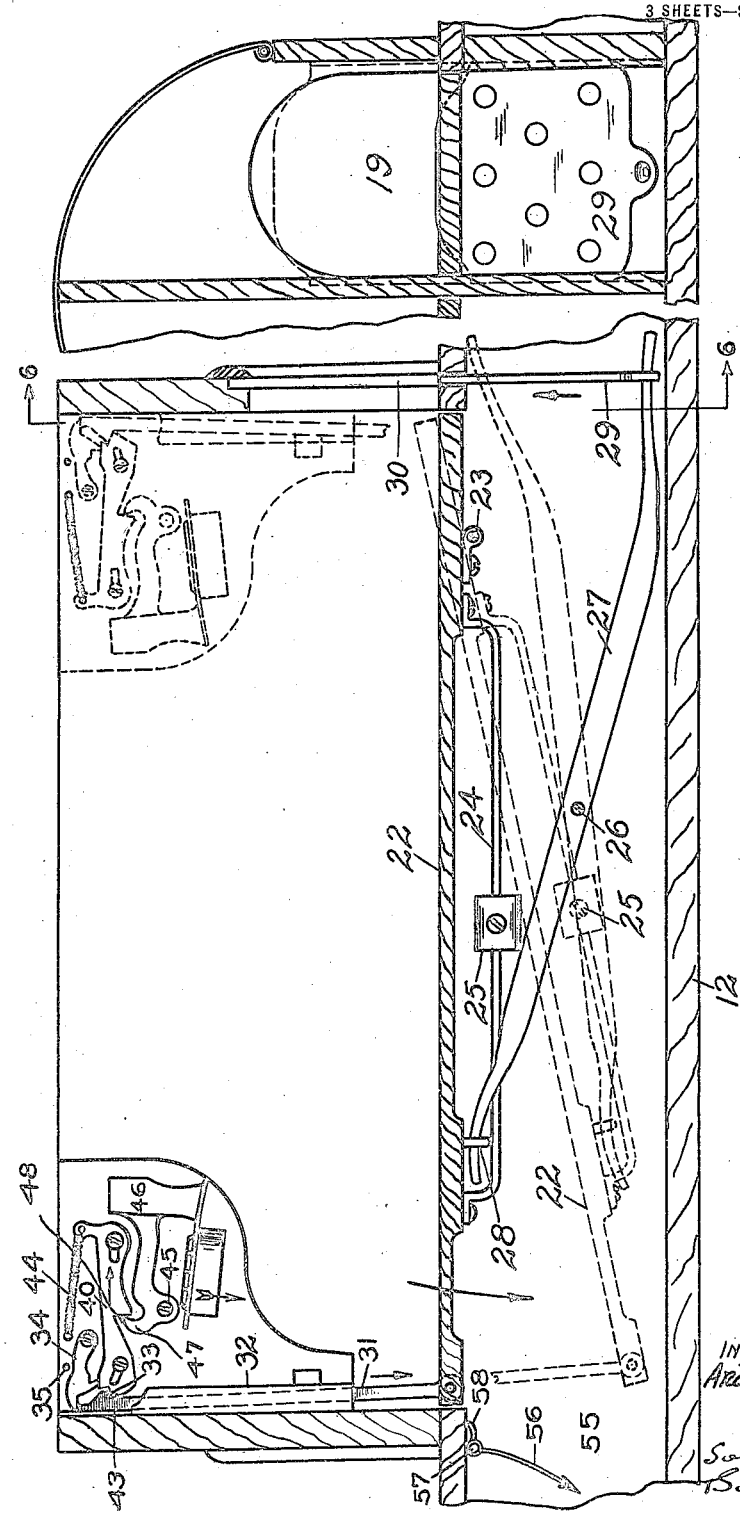

UNITED STATES PATENT OFFICE.

ANDREW KUBICKI, OF WEBSTER, MASSACHUSETTS, ASSIGNOR OF ONE-HALF TO MIKE NALEWAJK, OF WEBSTER, MASSACHUSETTS.

TRAP.

1,425,023.  Specification of Letters Patent.  Patented Aug. 8, 1922.

Application filed July 8, 1921. Serial No. 483,307.

*To all whom it may concern:*

Be it known that I, ANDREW KUBICKI, a citizen of the United States, residing at Webster, in the county of Worcester and State of Massachusetts, have invented a new and useful Trap, of which the following is a specification.

This invention is capable of general use, but is particularly suitable for catching rodents and especially rats.

The principal object of this invention is to provide a trap of great capacity which will reset itself so that very little attention will be required. I provide for this by arranging the device in such a manner that when an animal tries to get at the bait he opens the trap to let himself in and then closes the door below him which latter restores the bait and therefore the trap to a set position ready for the next one. I have also provided means whereby the device can be made in double form, taking up only a little more room than the single one.

The invention also involves improvements in the mechanism by which the victim is enabled to stand on a platform to reach the bait and automatically release the platform by his attempt to get at it so as to let it drop and entrap him; to provide means whereby all means of egress are cut off when the platform drops and means whereby the platform will restore itself afterwards without assistance and leave the trap and the bait in condition for receiving another animal and trapping him; to provide improvement in the bait holding device and its connections for operating the trap as well as in the arrangement of the parts by which the trap can be made in double form and its capacity doubled.

Reference is to be had to the accompanying drawings in which—

Fig. 4 is a horizontal sectional view on the line 4—4 of Fig. 2;

Fig. 5 is an enlarged longitudinal sectional view on the line 5—5 of Fig. 1;

Fig. 6 is a sectional view on the line 6—6 of Fig. 5;

Fig. 7 is a side elevation on an enlarged scale of the bait holder and trip mechanism for releasing the trap, shown in its released condition;

Fig. 8 is a fragmentary sectional view on the line 8—8 of Fig. 7;

Fig. 9 is a sectional view on the line 9—9 of Fig. 7; showing the bait holder in plan, and Fig. 10 is a front view of some of the guards for preventing the rats from going in the wrong direction.

Figure 1:
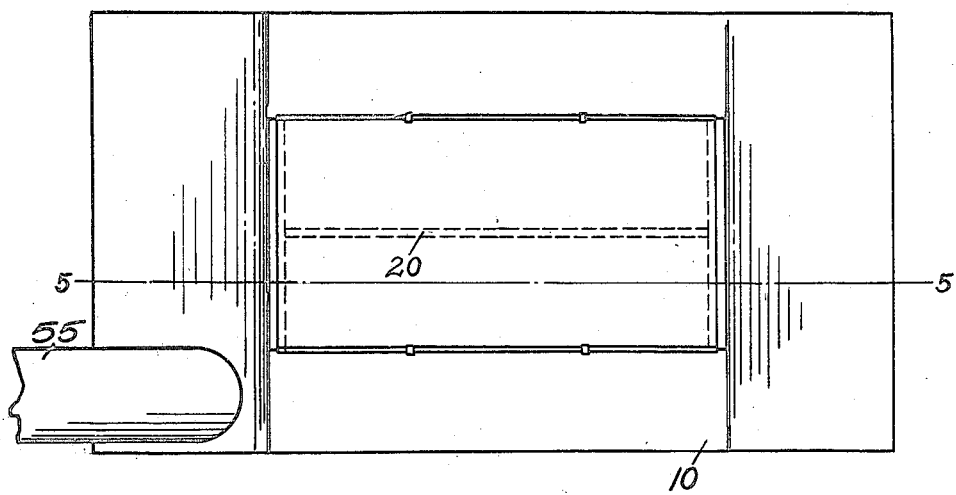
Fig. 1 is a plan of a double trap constructed in accordance with this invention.
Figure 2:
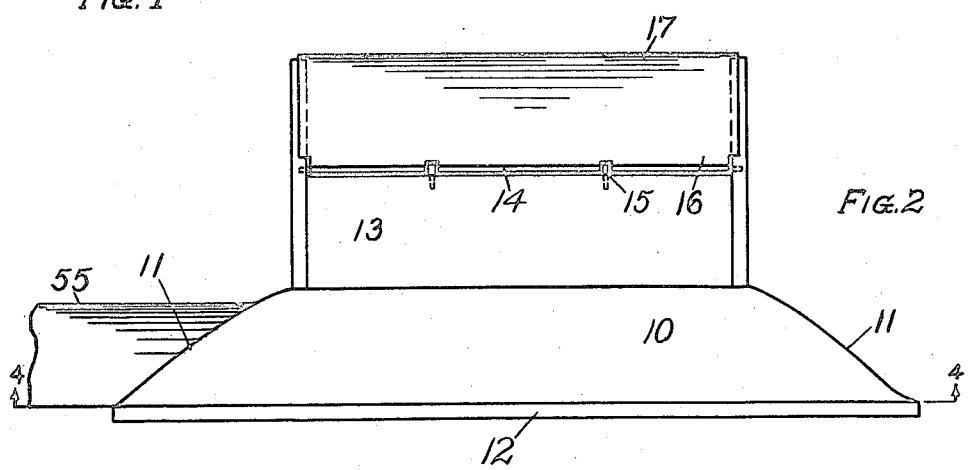
Fig. 2 is a side view of the same.
Figure 3:
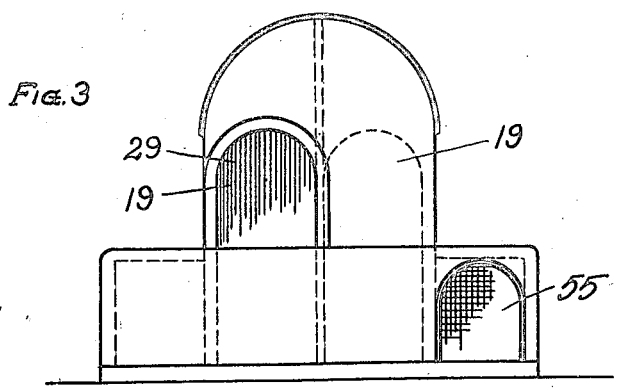
Fig. 3 is an end view.

Although the invention can be carried out in the form of a single trap, I have shown it constructed as a double one which doubles the capacity without greatly increasing the size of the device. For that purpose, I have shown a hollow base 10 having an elevated central portion and slanting front and rear ends 11. This casing is entirely closed by a bottom 12 and is arranged so that it can be placed on the ground or buried in the ground with the horizontal top portion just above it, if desired. On the top of this base there is a rectangular casing 13 provided with a longitudinal hinged rod 14 which passes through eyes 15 on the casing 13 and also through loops 16 formed on the bottom of a tin cover 17. I have shown this sheet metal cover as of semi-cylindrical form and the ends of the casing 13 as having a corresponding semi-circular shape. This provides for a casing above the base 10 having the general shape indicated in Figs. 2 and 3. On the side opposite the hinged rod 14, above described, there is a corresponding rod which is longitudinally detachable to permit of the swinging up of the cover to get inside of the casing to replace the bait or make repairs and the like.

Each of the ends of the casing 13 is provided at one side with an entrance opening 19. Extending along the inside of the casing 13 is a central vertical partition 20 dividing it into two compartments. Each compartment has an opening 19 at one end, the two openings 19 being located at opposite corners of the casing. The two compartments into which the casing is divided by the partition 20 are each furnished with a pivoted platform or floor 22. Each of these platforms swings on a fixed horizontal rod 23 near one end and is provided beneath it with a longitudinal rod 24 having a weight 25 thereon which can be adjusted back and forth. The position of this weight is determined by the weight of the floor and also by the size of the animals which are prevalent where the trap is to be placed. This adjustment back and forth obviously regulates the amount of weight hanging on the pivot 23.

Underneath the platform is a transverse rod 26 on which is pivoted a lever 27 on one end of which is an eye 28 located under the free end of the platform 22. The opposite end of this lever 27 is provided with a door 29 freely pivoted to it and movable in vertical guides 30 to close the opening 19. This door is shown as formed of a piece of metal plate and constitutes a weight for normally holding the platform 22 up in the position shown in Fig. 5, in full lines. The door is shown as perforated.

At the free end of the platform 22 it is provided with a link 31 working in a vertical guide 32 at the other end of this compartment. This link is provided with a tooth 33 at the top, and, as will be seen by comparison of the full line and dotted line positions in Figs. 5 and 7, this link moves up and down with the platform and cooperates with a latch 34 pivoted inside the compartment near the top thereof. This latch is moved up against a stop 35 by the end of the link 31 engaging a forward projection 36 on the latch as shown in full lines in Fig. 5. At that time a detent 37 on the latch 34 rests on top of a slide 40. This slide has a pair of slots 41 through which pass screws 42 secured to the central wall or partition 20. These slots not only support the slide 40 but guide it from the position shown in Fig. 5 to that shown in Fig. 7. In the former position a tooth 43 on the end of the slide engages under the tooth 33 and holds the platform positively in its raised position. On this account it will be seen that the platform is not yieldingly supported but furnishes a positively firm foundation or floor on which a rat can travel back and forth as much as desired without anything happening to frighten him away such as a slight motion of the floor itself. A spring 44 holds the slide 40 yieldingly in the position just described.

Underneath the slide 40 on a pivot 45 is located a lever 46 which is provided with a tooth 47 adapted to engage in a notch 48 in the bottom of the slide 40. In the position shown in Fig. 5 the weight of a bait receptacle 49 carried on the outer end of a lever 46 causes the tooth 47 to bear against the edge of the notch 48 but not with enough force to overcome the resistance of the spring 44. This bait receptacle is simply a piece of metal with a chamber 50 therein for the bait and is provided with a spring 51 to which is attached a perforated cover 52 yieldingly bearing down in the bait. Surrounding the receptacle 50 is a platform 53 which constitutes the support for the receptacle itself and for the spring 51.

When a rat smells the bait he will naturally reach for it and in order to get at it must put his paws on the platform 53. It is this added weight that operates the trap. This it does by swinging the lever 46 on its pivot and moving the tooth 47 back. This action draws the slide 40 back in the direction of the arrow in Fig. 5 and pulls the tooth 43 out from under the tooth 33. This removes all support from the link 31 and the platform 22 on which the rodent stands. Therefore, the platform descends to the dotted line position shown in Fig. 5 the rat going with it. Now, ordinarily, the rat will spring from the platform and usually will go into a chamber 55 below and move on beyond the end of the platform 22. He is facing in that direction and his four paws will have to find some point of support which they can find only on the floor 12 beyond the platform 22. If he should not jump off the platform he will still be holding it down in the position last mentioned and if he looks back he will see that the door 29 has risen and closed all means of egress in that direction. This action takes place through the operation of the lever 27. Even in that situation he is more likely to go forward into the passage 55 than to try to get out. If he does get all four feet off the platform 22 the weight of the door 29 will immediately raise the platform and close this exit against him so that he is permanently trapped in the space below the platform in either event. Another thing that should be noticed at this point is that when the slide 40 is drawn back to the position shown in Fig. 7 in the manner above mentioned, the latch 34 drops back to the position shown in that figure so that the detent 37 thereon enters the notch in the top of the slide and prevents that moving back so that it will not interfere with the link 31 and the action can take place freely. Whenever the platform 22 rises clear up to its horizontal position the top of the link 31 engages the tooth 36 and lifts the detent 37 out of the notch in the slide 48. This allows the slide to move back immediately and the spring 44 acts at once to force it back, lifting the bait again into the normal position shown in Fig. 5.

If the rat is left in the passage 55 it would be very natural for him to move forward in that passage at once. If, however, he does not do so he is left under the platform 22. He must either stay there or else go out to the left under a guard which consists of a row of pins 56 pivoted on a cross rod 57 located at the entrance to the passage 55. They have upwardly projecting ends 58 which prevent their moving back and are provided with sharp points at the bottom. The result of this is that if any rat tries to go back into the enclosure under the platform 22 he will meet these sharp points and they will not only resist his backward travel but will irritate him so that he will not be likely to overcome the resistance. The outlet 55 is intended to be connected with some other enclosure, not shown, preferably containing water, into which the rats will eventually be obliged to pass, or simply an enclosure from which they can be taken in any desired way as is usual in this art.

The above description refers to only one of the two halves of the device. The other half, as indicated more fully in Fig. 4, is located in the opposite position, that is, its door 19 is on the left instead of the right and the exit on the right instead of the left in that figure, but the operation is exactly the same and the mechanism the same in every particular. The rats pass out from below that platform 22 into a passage 60 under the top of the casing and encounter additional spring pin guards 61 like the pins 56. The rats pass along this passage 60 under an additional series of spring pins 62 into the passage 65 and then are taken care of in the same way as described above.

It will be seen, therefore, that not only is a double capacity trap formed with a very little increase in size but it is arranged for the rat to trip it and to reset it so that it is immediately in condition for catching another rat. It can work fast enough so that each half can have a capacity of sixty rats per minute and there is practically no danger of failure to work owing to more than one rat getting in at a time, for if they do, the one who sets off the trap is just as likely to get caught and the other one is also likely to go in the same direction with him and remain in the passage below when the platform rises. The trap does not need rebaiting for each rat caught and, in fact, it can catch an indefinite number without attention to the bait because the rat sets off the trap, not by getting, but by reaching for the bait. The construction is such that it is worked readily and easily and is protected from danger in working and at the same time from being clogged up and failing altogether. The parts can be got at readily and cleaned whenever desired.

Although I have described and illustrated only a single form of the invention I am aware of the fact that modifications can be made therein by any person skilled in the art, and that the device can be made single, without departing from the scope of the invention as expressed in the claims.

Therefore, I do not wish to be limited to all the details of construction, nor to the specific embodiment of the double trap, herein shown and described, but what I do claim is:—

1. In a trap, the combination with a hollow base, a casing located above it and divided into two compartments separate from each other, said base also having two compartments, one located directly under each of the compartments in the casing and adapted to receive an animal therein from the casing, an outlet directly connected with one end of one of said compartments, and a passage extending around that compartment and connected at one end with the other compartment and at the other end with said outlet.

2. In a trap, the combination with a hollow base, a casing located above it, said base having compartments adapted to receive an animal therein from the casing, an outlet directly connected with one end of one of said compartments, a passage extending around that compartment and connected at one end with the other compartment and at the other end with said outlet, and series of pointed pins pivotally mounted at the outlet and at the entrance to said passage and having their points projecting forwardly therein and extending down to constitute a guard to prevent the movement of an animal back under them after he passes them, said wires being pivoted to swing freely in a forward direction.

3. In a trap, the combination with a platform pivoted near one end and having a link extending upwardly from it, a movable member adapted to engage the link and positively hold the platform in its elevated position, a bait receptacle movably mounted and elevated above the platform, whereby when an animal standing on the platform tries to get at the bait he will move said bait receptacle, means connected with the bait receptacle for releasing the holding means, and an adjustable counterweight arranged to permit the platform to descend with the weight of an animal upon it and to restore the platform to horizontal position when the weight of the animal is removed.

4. In a trap, the combination of a pivoted platform, a bait receptacle pivotally mounted and provided with a projecting tooth, a slide having a notch with which said tooth normally engages and also provided with a tooth at the end and means connected with the free end of said platform for holding it up and having a projection normally resting on the last named tooth, whereby the platform is positively held in elevated position, and whereby on the tilting of the bait receptacle the slide will be drawn back and the platform released.

5. In a trap, the combination of a pivoted counter-weighted platform, a bait receptacle located above it and pivotally mounted and provided with a projecting tooth, a slide having a notch with which said tooth normally engages and also provided with a tooth at the end, and a link connected with the free end of said platform and having a projection normally resting on the last named tooth, whereby the platform is positively held in elevated position, and whereby on the tilting of the bait receptacle the slide will be drawn back and the link and platform released, the last named tooth and projection having slanting surfaces, whereby when the platform is restored by the counter-weight the slide will automatically lock the link in elevated position.

6. In a trap, the combination of a pivoted platform, a pivoted bait receptacle having a projecting tooth, a slide having a notch with which said tooth normally engages and also provided with a tooth at the end, and a link connected with the free end of said platform for supporting it and having a projection normally resting on the last named tooth, whereby the platform is positively held in elevated position, and whereby on the tilting of the bait receptacle the slide will be drawn back and the link and platform released, the last named tooth and projection having means whereby when the platform is restored to normal position the slide will automatically lock the link in elevated position.

7. In a trap, the combination of a pivoted counter-weighted platform, a bait receptacle located above it and pivotally mounted and provided with a projecting tooth, a slide having a notch with which said tooth normally engages and also provided with a tooth at the end, a link connected with the free end of said platform and having a projection normally resting on the last named tooth, whereby the platform is positively held in elevated position, and whereby on the tilting of the bait receptacle the slide will be drawn back and the link and platform released, the last named tooth and projection having slanting surfaces, whereby when the platform is restored by the counter-weight the slide will automatically lock the link in elevated position, a latch having means for automatically locking the slide in its retracted position when it moves to that position, and means on said link for automatically withdrawing the latch from the slide when the link is raised to its highest position.

8. In a rat trap, the combination of a pivoted counter-weighted platform, a pivoted bait receptacle having a projecting tooth, a slide having a notch with which said tooth normally engages and also provided with a tooth, a link connected with the free end of said platform and having a projection normally resting on the last named tooth, whereby the platform is positively held in elevated position, a latch having means for automatically locking the slide in its retracted position, means on said link for automatically withdrawing the latch from the slide when the link is raised to its highest position, and a spring for automatically forcing the slide into a position to hold up the link and at the same time restoring the bait receptacle to its normal elevated position.

In testimony whereof I have hereunto affixed my signature.

ANDREW KUBICKI.